Jan. 2, 1934.   W. A. LEWIS   1,941,902
BABY CARRIER
Filed Aug. 17, 1932   2 Sheets-Sheet 1

INVENTOR
Willis A. Lewis.

WITNESS
F. J. Hartman,

BY
ATTORNEY

Jan. 2, 1934. W. A. LEWIS 1,941,902
BABY CARRIER
Filed Aug. 17, 1932 2 Sheets-Sheet 2
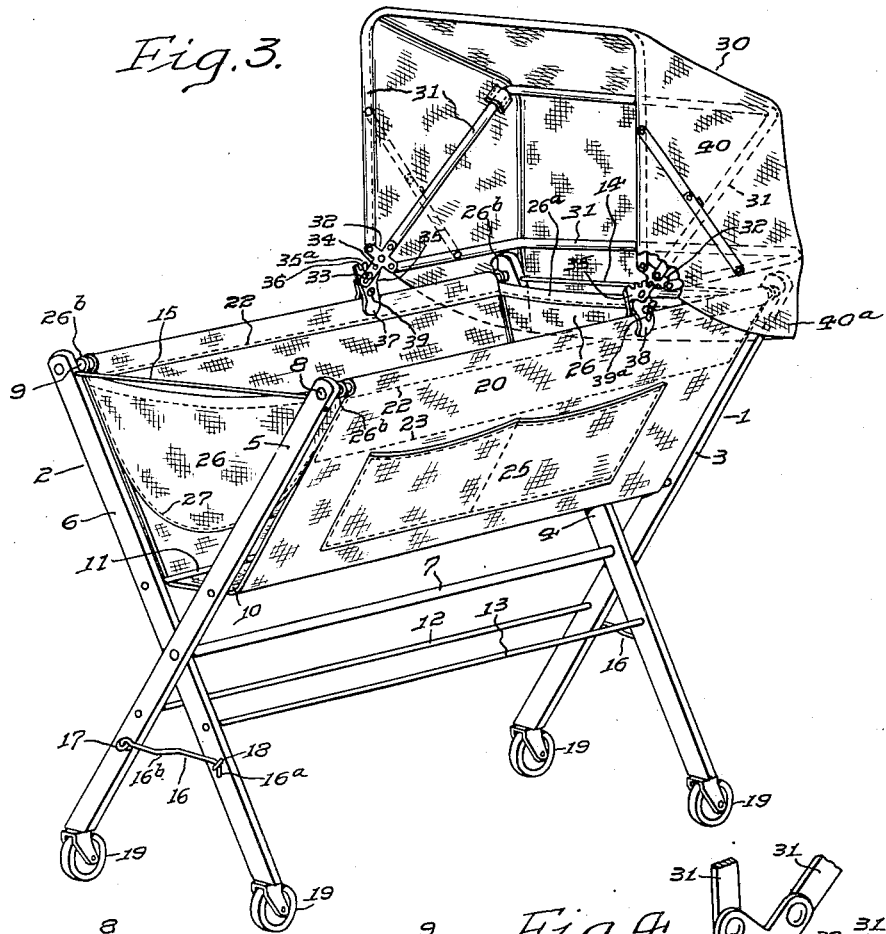
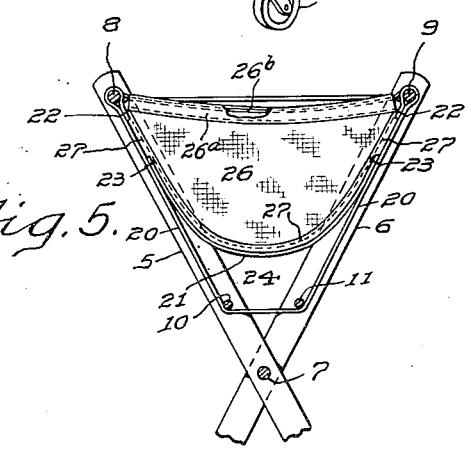
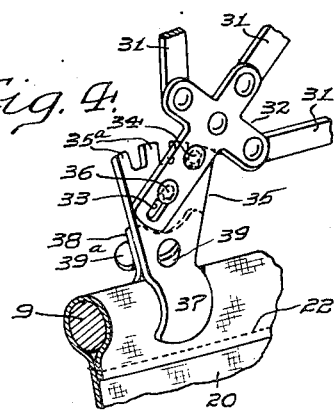
INVENTOR
Willis A. Lewis.

Patented Jan. 2, 1934

1,941,902

UNITED STATES PATENT OFFICE 1,941,902

BABY CARRIER

Willis A. Lewis, Christiana, Pa.

Application August 17, 1932. Serial No. 629,203

9 Claims. (Cl. 5—98)

This invention relates to baby carriers, and more particularly to a carrier whereby a baby may be safely and comfortably carried in an automobile and whereby the device with a baby in it may be readily moved from place to place when it is not in use in the car.

The objects of this invention are to provide a safe, comfortable, simple, durable and economical construction in which a baby may be safely and comfortably carried in an automobile without particularly discommoding the other passengers even up to the full complement of the car and which will not sway back and forth during transportation to subject the baby to danger of harm and injury; which is light in construction so as to be easily lifted and carried with the baby in it; which can be readily folded up into a compact form for storage; and in which the body or carrying portion is made of strong flexible material securely attached to a foldable or collapsible framework.

A further object is to provide a collapsible baby carrier which, when lifted by the rails, closes sufficiently to let it be passed easily through the door of an automobile.

Referring to the drawings forming a part of this specification and in which similar characters of reference indicate corresponding parts in the different figures, Fig. 1 is a perspective view of the framework assembly of my improved baby carrier;

Fig. 3 is a similar perspective view of the construction shown in Fig. 2 but with an adjustable canopy attached thereto;

Fig. 4 is a perspective view of a detail of construction comprising a combined clamp for attaching the canopy to the side rails of the carrier and an adjustment for setting the canopy at different angles;

Fig. 5 is a transverse vertical sectional view of the upper part of the carrier.

Figure 1:
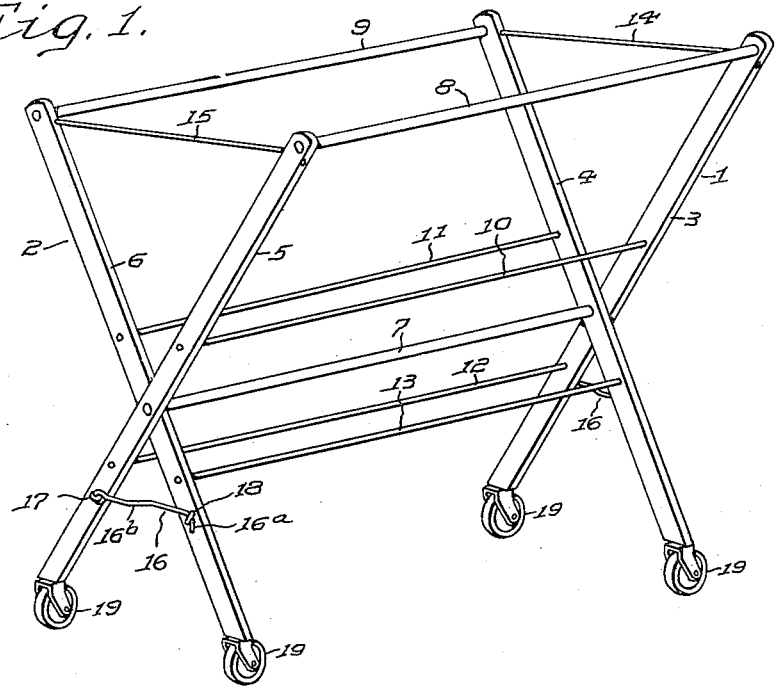

The framework of this baby carrier or folding bed comprises two members 1 and 2 which, for convenience, will herein be referred to as the head member 1 and the foot member 2, although both end members are substantially alike and either may be used as the head end of the bed. The head member comprises a pair of crossed legs 3, 4, pivotally connected together where they cross intermediate the ends of the legs and the foot member comprises two similar rigid legs 5, 6, similarly pivoted together intermediate their ends at the point where the legs cross each other. I preferably so pivot the legs of the head member and of the foot member on a single light stiff bar 7, passing through each leg at the point where one leg intersects with the other, the head member being at one end of the rod or bar 7 and the foot member at the opposite end of the bar or rod 7. Preferably, the legs 4 and 6 are made fast to the pivot rod but the legs 3, 5 are preferably freely rotatable on the bar 7 so that the device may be rigid but easily foldable.

The legs 3, 5 of the head 1 are rigidly connected together by three sets of longitudinal rods and the legs 4, 6 are also rigidly connected together by three parallel rods or bars as follows:

The upper ends of the legs 3, 5 are connected together by a rigid side rail 8 passing through said legs and fixedly secured thereto in any suitable manner and the upper ends of the legs 4, 6 are similarly connected together by a rigid side rail 9. The legs 3, 5 are also rigidly connected together by a stay rod 10 attached to said legs at a point preferably a little above the horizontal plane in which is the pivot rod 7, and the legs 4, 6 are similarly rigidly connected together with a tie rod 11.

The legs 3, 5 are further rigidly connected together by a tie rod 12 and the legs 4, 6 are similarly connected by a tie rod 13. These tie rods 12 and 13 are preferably in a horizontal plane a little below that in which is the axis of the pivot rod 7 but they are preferably located as close to the pivot rod 7 as is practicable and consistent with rigidity, one object being to locate the rods 12 and 13 just as far from the lower ends of the legs as possible so that when the device is placed in the tonneau of an automobile they will not substantially interfere with the free movement of the legs of the passengers who may be seated on the seat in the tonneau.

The upper ends of the legs 3, 4 are preferably connected together with a flexible wire covered cord 14 and the upper ends of the legs 5, 6 by a similar cord 15 rigidly anchored or secured to the respective legs in any suitable manner. These flexible connections 14 and 15 are for the purpose of preventing any undue spread of the head and foot members but they do not, of course, prevent the approach of the upper ends of the head members toward each other. I therefore provide the legs of the head member 1 and of the foot member 2 respectively with hooks 16, each pivotally mounted in an eye-screw 17 at one end and provided with a downturned end 16ª forming a hook and passing through an eye-screw 18. The hooks 16 not only serve to limit the spread of the legs of the head or foot members but they also perform another function, to wit, that of preventing the baby carrier from folding up or collapsing on the baby. The outer surfaces of the legs 3, 4 and the outer or end surfaces of the legs 5, 6 are respectively in different planes. The hooks 16 are preferably hinged or pivotally mounted to the outer surface of the outer leg 5 and the outer surface of the other outer leg 3 respectively. This makes it desirable to provide the shank of the hook 16 between its ends with a lateral offset 16ᵇ and the eye-screw 18 is preferably turned to make a substantial angle to the horizontal so that when the head and foot members 1 and 2 are collapsed or the upper ends are moved toward each other, the shank 16 slides on through the inclined eye-screw 18 until the shoulder 16ᵇ reaches the eye-screw, whereupon that shoulder prevents any further collapse of the frame. The purpose of this construction will be referred to again below.

The lower end of each leg is preferably provided with a ball bearing caster 19 so that the framework can be easily moved in any direction on a smooth plane surface.

This rigid connection between the side rails 8, 9 and the upper ends of the legs; between one leg of the head member and one leg of the foot member to the common rigid pivot rod 7; and the grouping of the tie rods 10 and 11 above and the tie rods 12 and 13 below, and all relatively close to the pivot rod 7, results in a structure so rigid that the carrier, with the baby in it, may be rolled on its large ball bearing casters 19 over any ordinarily smooth hard walks and pavements with ease and without excessive vibration, even though the whole device be made light enough to be easily carried up and down stairs, and lifted into and out of an automobile, with the baby in the carrier.

The body of the baby carrier is preferably made of canvas, but, of course, any other suitable strong sheet material may be employed. The body comprises preferably two pieces of fabric which are herein referred to as the supporting or anchoring sheet 20 and the bed bottom sheet 21. The length of the supporting or anchor sheet 20 is preferably the full length of the rails 8 or 9 between the legs connected thereby and one side of the outer or anchor or supporting sheet is preferably folded over and around one rail (e. g. the rail 8) and is permanently secured thereto as by a row of stitches 22 and then is carried down under and across the said rods 10 and 11 and then the other side of the sheet is preferably tightly wrapped around the other rail 9 and secured thereto, as by a like row of stitches 22.

The opposite side edges of the bottom sheet 21 are securely fastened to the supporting sheet 20, as by a row of stitches 23, the side edges of the bottom sheet 21 being preferably spaced from and stitched parallel to the adjacent edge of the supporting sheet. In this way the supporting sheet hangs from the rails 8 and 9 and passes under the stay rods 10 and 11 and the bed sheet 21 secured to the supporting sheet also hangs substantially between the rails 8 and 9 but higher than and clear of the rods 10 and 11. In this way the bed so formed is prevented from swinging or swaying by reason of the attachment of the bed sheet at its side edges, to the opposite yielding unswinging stretches of the anchor sheet 20, and this yielding connection between the edges of the bottom bed sheet 21 and the side rails 8 and 9 through the supporting sheet 20 prevents the ordinary vibrations, incident to a moving automobile, from being communicated to the baby lying on the bottom sheet 21. This construction perfectly prevents any swinging or swaying back and forth of the red sheet 21. This arrangement, moreover, affords an open ended space 24 extending the full length of the bed or carrier in which may be stored a variety of things needed by a baby, particularly when going on an automobile trip, and for storage purposes I also preferably provide at least one side of the outer or anchor sheet with a large double pocket 25 for bottles and other needed accessories.

The ends of the bed are preferably closed by end pieces 26—26, both alike, and shaped to conform to the contour of the end of the bed from the side rails downwardly to the bottom sheet 21 and thence across, conforming to the shape of the edge of the bottom sheet, and the edge of the end flaps or closures 26 and secured in any suitable manner, as by stitches 27, from the hem at the edge of the supporting sheet to the stitching 23 and thence its bottom edge is stitched to the edge of the sheet 21 and when those edges have thus been united, the balance of the edge of the end piece 26 is united by the stitches 27 to the end of the anchor sheet between the stitching 22 and the hem at the rail. I preferably provide the upper edges of the end pieces 26 with a suitable hem 26ª through which may be passed a flexible wire 26ᵇ stretched between the side rails 8 and 9 when the bed or carrier is open.

This carrier is also very adaptable to the attachment thereto of a collapsible detachable canopy top 30 as shown in Fig. 3, the ends of the bows 31 of which are respectively pivotally attached to the upper ends of a pair of brackets 32 as clearly shown in Fig. 4. This bracket is provided with a slot 33 on the lower downwardly extending portion thereof and with a pin 34 between said slot and the ends of the said bows 31, said pin 34 extending preferably outwardly from said member 32.

The clamping member 35 is also provided with a rigid pin 36 passing inwardly through the slot 33 and the top of the clamping member 35 is provided with a series of teeth 35ª between which the pin 34 is adapted to be positioned.

The clamping member is provided at its lower end with a jaw 37 rigid therewith and cooperating with a movable jaw 38 secured to the clamping member 35 by a screw 39 and wing nut 39ª. The contour of the clamping members 37 and 38 is such as to fit around either of the rods 8 or 9 and to be clamped securely thereto.

The bows 31 are preferably covered with a flexible fabric 40 in the usual manner for being opened or collapsed.

In order to adjust the canopy to different angles or to different positions, it is merely necessary to draw upwardly on the canopy, sliding the member 32 on the pin 36 until the pin 34 is disengaged from the teeth 35ª in which it was seated. The whole canopy then is adapted to be turned forwardly or rearwardly on the pin 36 as a center to the desired position and is then slid downwardly to bring the pin 34 into engagement with other teeth 35ª by which engagement the canopy is rigidly maintained in such adjusted position. The lower edge 40ª of the fabric 40 is preferably provided with a flap which may be fitted around outside of the end and sides of the carrier to protect the baby's neck from drafts.

Figure 2:
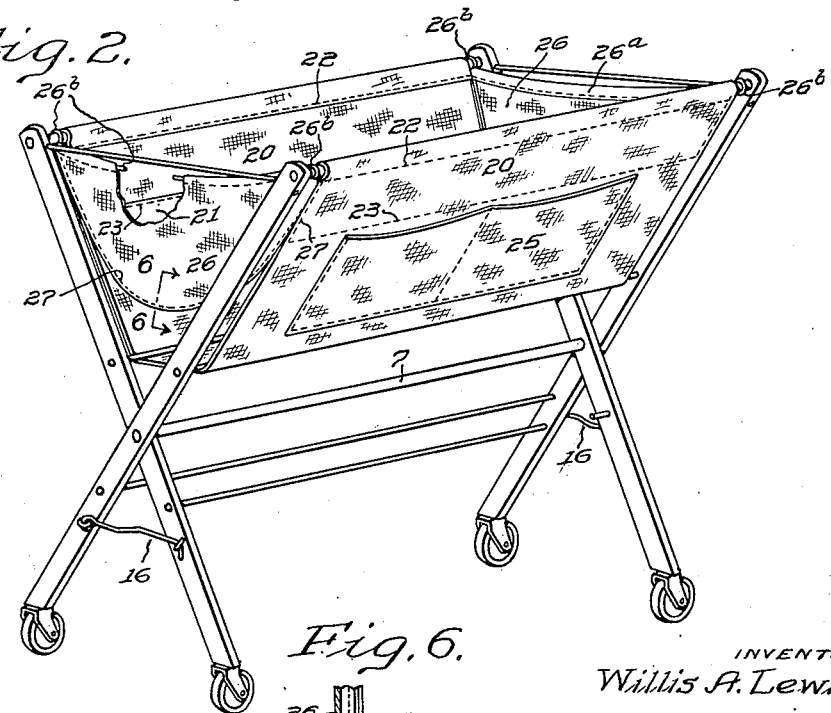
Fig. 2 is a similar perspective view of the baby carrier with the fabric or upholstery secured thereto.
Figure 6:
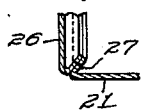
Fig. 6 is a fragmentary cross-sectional view on the line 6—6 of Fig. 2.

Now referring back to Fig. 2 and to the hooks 16 shown therein, it will be seen that when one lifts the baby carrier, with the baby in it, by grasping the side rails 8 and 9, the carrier tends to collapse, the rails 8 and 9 approaching each other and the free end of the hook 16 sliding forwardly through the eye-screw 18 until the offset bend 16ᵇ engages the eye-screw 18 and this offset 16ᵇ limits the extent to which the couch can be collapsed. In actual use, I prefer to locate the offsets 16ᵇ at such a point that the upper rails can so approach each other for about one-third of the distance between them when the carrier is wide open. This is ample to permit of the easy transfer of the carrier into or out of a car through and clear of the sides of the door.

But a further and greater advantage attaches to the use of the offset in the hooks 16, in that they prevent any accidental complete collapse of the frame with the baby enclosed within the flexible sheets.

When the carrier is provided with the canopy 30, these hooks 16 similarly limit the extent to which the carrier may be collapsed, for the bows 31 are of light construction and their free ends, where they are pivoted to the members 32, are easily flexed sufficiently to permit of the approach of the rails 8 and 9 at the head 1 to substantially the point set by the hook 16 on the head member 1 and the hook 16 on the foot member thereby prevents the imposition of strains sufficient to weaken or impair the connection between the legs and the rails, the tie rods and the pivot rod. It will now also be apparent that the device can be thus partially collapsed with a baby in it and taken into or removed from an automobile without taking the baby out of the device and without disturbing the baby, if asleep, and, more than this, the carrier, when removed from the car, may be pushed around on its casters, over any ordinary smooth hard surfaces in any direction, like a baby carriage or bassinet. In fact, the device may be considered to be, and substantially is, a baby carriage which can be partially collapsed and readily put into and removed from the tonneau of an automobile and which fits, and stands on its legs in the tonneau without interfering in the slightest with the free movement of the feet and legs of the occupants of the rear seat.

Although I have specifically shown the sides of the supporting member as wrapped around the rail and stitched and the sides of the bottom sheet as stitched to the supporting member, it is plain that any other suitable manner of securely attaching the supporting member to the rails 8, 9, the side edges of the bottom sheet to the supporting member, and even the end pieces 26 to the supporting member and bottom sheet, as by buttons or snap fasteners, may be employed for removably securing these parts together, such constructions being fully within the purport of the claims herein. And it is to be understood that the invention is not to be construed as being confined strictly to the details described herein unless expressly limited by the claims themselves, for many changes in construction and arrangements may be made without departing from the spirit and scope of this invention.

Having thus described my invention, what I claim and desire to protect by Letters Patent of the United States is:

1. In a folding bed, the combination of a head member and a foot member, each comprising a pair of pivotally connected crossed legs, a pair of parallel side rails rigidly connecting together the upper ends of the complemental legs of said head and foot members respectively and two parallel tie rods also respectively connected together to said complemental legs below said rails, a supporting sheet extending substantially the full length of said rails between said heads, and fitting snugly against the undersides of said tie rods and having its side edges securely attached to said rails respectively, a bottom sheet having its side edges securely attached to said supporting sheet parallel to said rails and hanging from said edges between said rails and clear of said tie rods and end pieces of fabric respectively closing the head and foot ends of said bed from said bottom sheet to substantially the level of said side rails.

2. In a folding bed, the combination of a head member and a foot member, each comprising a pair of pivotally connected crossed legs, a pair of parallel side rails rigidly connecting together the upper ends of the complemental legs of said head and foot members respectively and two parallel tie rods also respectively connected together to said complemental legs below said rails, a supporting sheet extending substantially the full length of said rails between said heads, and fitting snugly against the undersides of said tie rods and having its side edges securely attached to said rails respectively, a bottom sheet having its side edges securely attached to said supporting sheet parallel to said rails and hanging from said edges between said rails and clear of said tie rods, end pieces of fabric respectively closing the head and foot ends of said bed from said bottom sheet to substantially the level of said side rails, and two flexible connections extending across said bed from rail to rail, adjacent said head and foot members upon which the upper edges of said end pieces are respectively suspended.

3. In a folding bed, the combination of a head member and a foot member, each comprising a pair of crossed legs, a pivot rod passing through said members at the intersections of said legs, a pair of side rails rigidly connecting together respectively the upper ends of the complemental legs of the head and foot members and two tie rods also respectively connecting together said complemental legs between said pivot rod and the said rails, a supporting and anchor sheet extending the full length of said bed and drawn snugly against the underside of said tie rods and having its side edges securely attached to said rails respectively and a bottom sheet having its side edges securely attached to said supporting sheet parallel to said rails and hanging from said supporting sheet between said rails clear of said tie rods, the head and foot ends of said bed being closed respectively by pieces of fabric each having its edges stitched to said anchor sheet between said rails and the sides of the bottom sheet, and therebetween to the end edges of the bottom sheet.

4. In a folding bed, the combination of a head member and a foot member, each comprising a pair of supporting legs, a pair of parallel side rails connecting together the upper ends of the complemental legs of said members, a flexible supporting member hanging between said rails and having its side edges secured thereto, means for preventing said member from swaying laterally with respect to said frame, a bottom sheet having its side edges attached securely to said supporting member below said rails and hanging between said rails, and end pieces of fabric closing the head and foot ends of said bed from said bottom sheet upwardly to substantially the level of said side rails.

5. In a folding bed, the combination of a head member and a foot member, each comprising a pair of supporting legs, a pair of parallel side rails connecting together the upper ends of the complemental legs of said members, a flexible supporting member hanging between said rails and having its side edges secured thereto, means for preventing said member from swaying laterally with respect to said frame, a bottom sheet having its side edges attached securely to said supporting member below said rails and hanging between said rails, and an end piece of fabric for closing the end of said bed, the edge of said end piece being securely attached to the edge of said bed sheet for the full width of said bed sheet and to said supporting member between the edges of said bed sheet and said rail.

6. In a folding baby carrier, the combination of a head member and a foot member, each comprising a pair of crossed legs, a pivot rod passing through said members at the intersections of the legs, a pair of side rails rigidly connecting together respectively the upper ends of the complemental legs of the head and foot members, a tie rod for each pair of complemental legs respectively and positioned above said pivot rod, a pair of tie rods for each pair of complemental legs respectively and positioned below said pivot rod, said pivot rod and said tie rods forming a very rigid bracing between said coacting legs below said side rails and relatively remote from the lower ends of said legs, casters on the lower ends of said legs, strong fabric means stretched between said side rails and the upper pair of said tie rods respectively, a bottom sheet having its opposite side edges respectively securely attached to said fabric means and hanging loosely therebetween, and means to fixedly limit the distance that said side rails may be moved away from each other.

7. In a folding baby carrier, the combination of a head member and a foot member, each comprising a pair of crossed legs, a pivot rod passing through said members at the intersections of the legs and rigidly connected to one leg of each pair of legs, a pair of side rails rigidly connecting together respectively the upper ends of the complemental legs of the head and foot members, a tie rod for each pair of complemental legs respectively and positioned above said pivot rod, a pair of tie rods for each pair of complemental legs respectively and positioned below said pivot rod, said pivot rod and said tie rods forming a very rigid bracing between said coacting legs below said side rails and relatively remote from the lower ends of said legs, casters on the lower ends of said legs, strong fabric means stretched between said sde rails and the upper pair of said tie rods respectively, a bottom sheet having its opposite side edges respectively securely attached to said fabric means and hanging loosely therebetween, and means to fixedly limit the distance that said side rails may be moved away from each other.

8. In a folding baby carrier, the combination of a head member and a foot member, each comprising a pair of crossed legs, a pivot rod passing through said members at the intersections of the legs, a pair of side rails rigidly connecting together respectively the upper ends of the complemental legs of the head and foot members, a tie rod for each pair of complemental legs respectively and positioned above said pivot rod, a pair of tie rods for each pair of complemental legs respectively and positioned below said pivot rod, said pivot rod and said tie rods forming a very rigid bracing between said coacting legs below said side rails and relatively remote from the lower ends of said legs, casters on the lower ends of said legs, strong fabric means stretched between said side rails and the upper pair of said tie rods respectively, a bottom sheet having its opposite side edges respectively securely attached to said fabric means and hanging loosely therebetween, means to fixedly limit the distance that said side rails may be moved away from each other, and sliding means to permit said carrier to partially collapse when the carrier is lifted by the side rails and to rigidly limit the distance whch said s.de rails may approach when so lifted, whereby said carrier may be partially collapsed and easily carried through the door of an automobile and when placed on an ordinary firm hard smooth surface automatically opens to its full limit and possesses rigidity sufficient to be pushed on its rollers over said surface.

9. In a folding baby carrier, the combination of a head member and a foot member, each comprising a pair of crossed legs, a pivot rod passing through said members at the intersections of the legs, a pair of side rails rigidly connecting together respectively the upper ends of the complemental legs of the head and foot members, a tie rod for each pair of complemental legs respectively and positioned above said pivot rod, a pair of the tie rods for each pair of complemental legs respectively and positioned below said pivot rod, said pivot rod and said tie rods forming a very rigid bracing between said coacting legs below said side rails and relatively remote from the lower ends of said legs, casters on the lower ends of said legs, strong fabric means stretched between said side rails and the upper pair of said tie rods respectively, a bottom sheet having its opposite side edges respectively securely attached to said fabric means and hanging loosely therebetween, sliding means to fixedly limit the distance that said rails may be moved away from each other, and to rigidly limit the distance that said rails may be moved toward each other to a partially collapsed position, whereby said carrier may be partially collapsed and easily carried through the door of an automobile and when placed on an ordinary firm hard smooth surface automatically opens to its full limit and possesses rigidity sufficient to be pushed on its rollers over said surface.

WILLIS A. LEWIS.